United States Patent [19]

Fredericks et al.

[11] Patent Number: 6,115,361
[45] Date of Patent: Sep. 5, 2000

[54] LINK INCIDENT REPORTING EXTENDED LINK SERVICE FOR NETWORKS

[75] Inventors: Kenneth J. Fredericks, Boulder; Michael E. O'Donnell, Westminster, both of Colo.; Giles R. Frazier, Austin, Tex.; Roger G. Hathorn, Tucson, Ariz.

[73] Assignee: McData Corporation, Broomfield, Colo.

[21] Appl. No.: 09/225,521

[22] Filed: Jan. 6, 1999

[51] Int. Cl.⁷ .............................. G01R 31/08; G06F 11/00
[52] U.S. Cl. ........................ 370/242; 370/469; 359/177; 359/110; 710/17; 714/25
[58] Field of Search ..................... 359/177, 110; 709/251; 710/11, 17; 714/4, 25; 370/242, 469, 529, 535

[56] References Cited

U.S. PATENT DOCUMENTS

| | | | |
|---|---|---|---|
| 5,638,518 | 6/1997 | Malladi | 709/251 |
| 5,642,217 | 6/1997 | Carbone, Jr. et al. | 359/177 |
| 5,944,798 | 8/1999 | McCarty et al. | 709/251 |
| 6,014,715 | 1/2000 | Stoevhase | 710/11 |

*Primary Examiner*—Hassan Kizou
*Assistant Examiner*—John Pezzlo
*Attorney, Agent, or Firm*—Stuart T. Langley; William J. Kubida; Richard A. Bachand

[57] ABSTRACT

A method for implementing a link level service in a computer network having a first port device and a second port device coupled by a communication link. Prior to a link incident being reported, the first port device executes a link incident record registration (LIRR) ELS message addressed to the second port device. The second port device responds to the LIRR by adding an address of the first port device to a registration list of ports registered to receive link incident reports. The second port device also responds to the LIRR by sending an accept reply message addressed to the first port device. After a link incident is detected by the second port device, the second port device generates a link incident record comprising data describing the link incident. The second port device selects an address from the registration list sends a registered link incident record ELS message addressed to the selected address.

16 Claims, 4 Drawing Sheets

LINK INCIDENT REPORTING EXTENDED LINK SERVICE FOR NETWORKS

BACKGROUND OF THE INVENTION

1. Field of the Invention

The present invention relates, in general, to network data communications, and, more particularly, to an extended link service that provides information about link incidents on a fibre channel fabric.

2. Relevant Background

Fibre Channel is a high performance serial interconnect standard designed for bi-directional, point-to-point communications between servers, storage systems, workstations, switches, and hubs. It offers a variety of benefits over other link-level protocols, including efficiency and high performance, scalability, simplicity, ease of use and installation, and support for popular high level protocols.

Fibre channel employs a topology known as a "fabric" to establish connections (paths) between ports. A fabric is a network of switches for interconnecting a plurality of devices without restriction as to the manner in which the switches can be arranged. A fabric can include a mixture of point-to-point, circuit switched, and arbitrated loop topologies.

In Fibre channel, a path is established between two nodes where the path's primary task is to transport data from one point to another at high speed with low latency, performing only simple error correction in hardware. The fibre channel switch provides flexible circuit/packet switched topology by establishing multiple simultaneous point-to-point connections. Because these connections are managed by the switches or "fabric elements" rather than the connected end devices or "nodes", fabric traffic management is greatly simplified from the perspective of the device.

To connect to a fibre channel, fabric devices include a node port or "N_Port" that manages the fabric connection. The N port establishes a connection to a fabric Element (e.g., a switch) having a fabric port or F_port. Devices attached to the fabric require only enough intelligence to manage the connection between the N_Port and the F_Port. Fabric elements include the intelligence to handle routing, error detection and recovery, and similar management functions. Fabric elements provide these functions by implementing a variety of services. Although some basic services are required to be provided by all fibre channel devices, a wide variety of optional or extended services can be implemented to provide additional functionality.

The fibre channel structure is defined as a five layer stack of functional levels, not unlike those used to represent network protocols. The five layers define the physical media and transmission rates, encoding scheme, framing protocol and flow control, common services, and the upper level application interfaces. FC-0, the lowest layer, specifies physical characteristics of the media, transmitters, receivers and connectors. FC-1 defines the 8B/10B encoding/decoding scheme used to integrate the data with the clock information required by serial transmission techniques. FC-2 defines the framing protocol for data transferred between ports, as well as the mechanisms for using Fibre Channel's circuit and packet switched service classes and the means of managing the sequence of a data transfer. FC-2 is often referred to as the "link level". FC-3 is undefined and currently is not used. FC-4 provides integration of FC-2 level frames with existing standards and protocols such as FDDI, HIPPI, IPI-3, SCSI, Internet Protocol (IP), Single Byte Command Code Set (SBCCS), and the like.

Services can be readily provided at the FC-2 and FC-4 levels (or the FC-3 level when implemented). Each data packet sent between fabric elements includes a "header" that includes fields holding addressing and other packet-specific information. A certain number of codes are reserved in the header to identify packets that are providing services from packets that are transferring user-level data. Upon receipt of a packet having a recognized service code in the header, a receiving device knows that the payload data is not regular information traffic. If the receiving device offers the service specified by the code, it will execute routines to implement the service. If the receiving device does not offer the service specified by the code, it returns a packet to the sender with a header code indicating that the particular service is not supported. This system enables the variety of services offered by a particular device to be expanded so long as code space remains to uniquely identify each service.

A "link incident" refers to an event that has effected or may effect the ability to transfer data over a link. A link incident may be caused, for example, by a variety of hardware or software failures, limitations in the original fabric design, or unexpected traffic volume. For example, a broken or disconnected fibre optic link, a port electronics failure, misconfigured cabling, a degrading transmit laser, or the like may result in a link incident. Not all link incidents render the link non-operational, and the port in which the link incident occurs may have some ability to recover from any particular incident without affecting other devices in the fabric.

After a link disruption or malfunction such as loss-of-light on the link interface, it is useful for a centralized intelligence to analyze the link incident and take appropriate remedial action. This is particularly true in communication systems where data is transported asynchronously as a link failure or degradation cannot be immediately, unambiguously detected simply from a failure to receive data. As a result, prior systems without link incident reporting may not detect a link failure or degradation and instead continue to route data over the failed link.

Moreover, to effectively address a link incident it is useful to have information about the incident in addition to merely detecting that an incident has occurred. However, past systems lack a system and methodology for exchanging link incident information in a manner that lends itself to centralized collection and analysis of the link incident data. As a result, link incidents were often difficult to diagnose and correct. Accordingly, a need exists for a system and method for providing link incident report management in an asynchronously connected data communication environment.

SUMMARY OF THE INVENTION

Briefly stated, the present invention involves an Extended Link Service (ELS) for Fibre channel fabrics which supports the asynchronous notification of detected link incidents, and provides information describing the link incident condition in all class of service. Optionally, incident specific information is provided. In a preferred implementation, the ELS frames implementing the present invention are transmitted using the FT-1 frame format via Class 2, Class 3, or Class F service.

More specifically, the present invention involves a method for implementing a link level service in a computer network having a first port device and a second port device coupled by a communication link. Prior to a link incident being reported, the first port device executes a link incident record registration (LIRR) ELS message addressed to the second port device. The second port device responds to the LIRR by adding an address of the first port device to a registration list of ports registered to receive link incident reports. The second port device also responds to the LIRR by sending an accept reply message addressed to the first port device. After a link incident is detected by the second port device, the second port device generates a link incident record comprising data describing the link incident. The second port device selects an address from the registration list sends a registered link incident record ELS message addressed to the selected address.

DETAILED DESCRIPTION OF THE PREFERRED EMBODIMENTS

Link-Incident reporting refers to an ability of a device to provide link-incident information to simplify problem detection and resolution in a fibre-channel environment. Specifically, link incident reporting in accordance with the present invention assists in isolating a link-incident condition to the failing node, link interface, or the like. This ability addresses a number of problems, including, but not limited to, the following:

incorrect fabric definition (hardware and software);

misconfiguration (hardware fiber cabling);

non-operational conditions (e.g. open fiber, ports zoned, etc.);

fiber or node failures;

Particular advantages of the present invention include asynchronous notification of detected incidents and description of the incident condition with optional incident specific information.

The present invention is usefully described and understood in terms of a protocol and exemplary data formats used to implement the request-reply protocol in a fibre channel FC-2 level (i.e., link-level) implementation using an FC-2 extended link service which is believed to be the most useful implementation of the present invention. It should be understood that any particular implementation will allow a wide latitude in constructing the data packet format and the particular information that is provided in the node identification data. An alternative implementation of the present invention involves using the specified fiber channel layer four (FC-4) link service request and reply protocols for the RLIR request, the LIRR request, and the accept reply. In this case, the FC-PH Header fields comprise an R_CTL field set to hex '32' for request frames, hex '33' for reply frames, and the type field set to hex '18' in a particular implementation to indicate an SBCCS frame type. The remaining fields are set to values indicated in the description of the FC-2 extended link service implementation.

Figure 1:
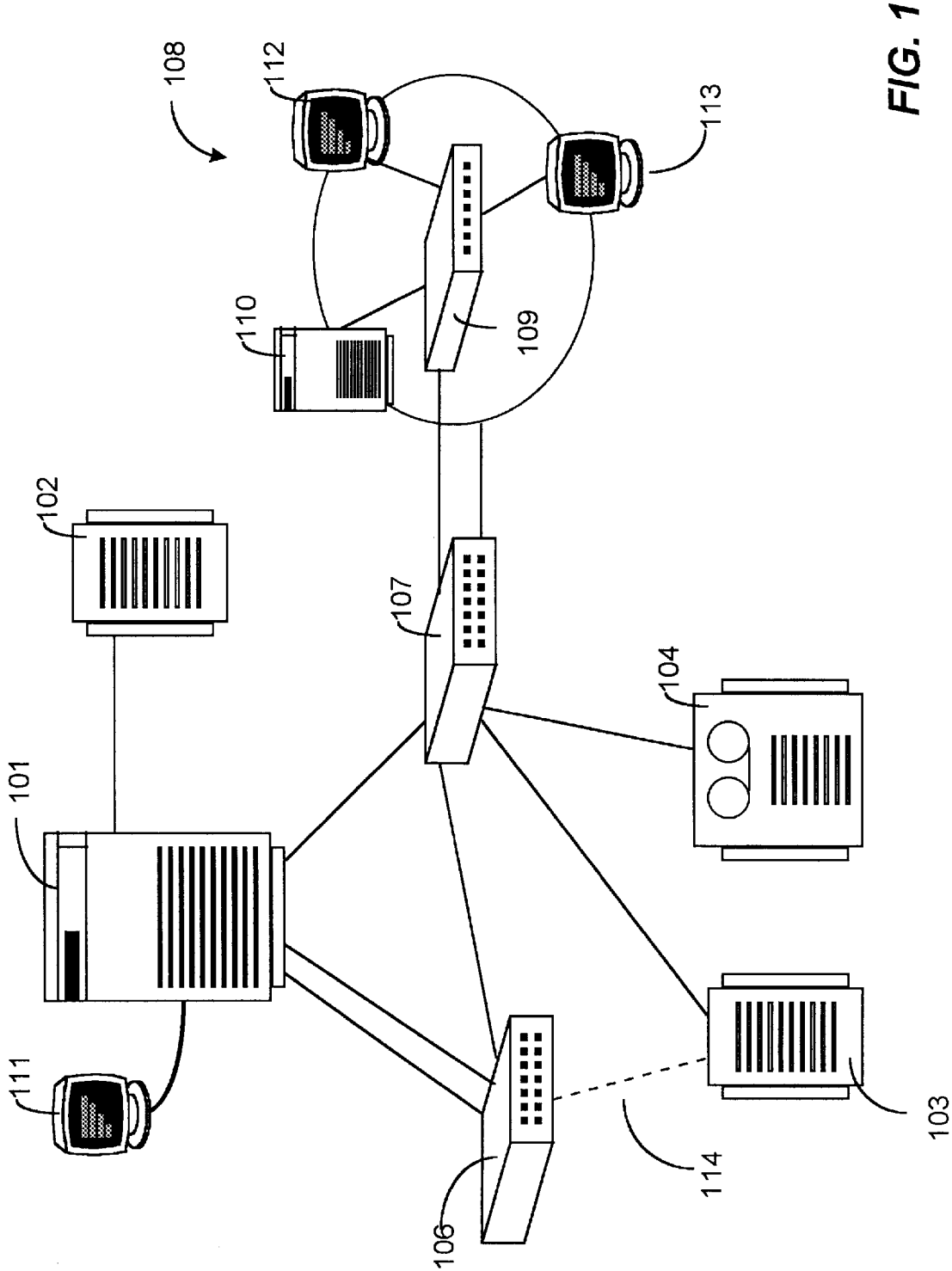
FIG. 1 shows a generalized fibre channel environment implementing the method and systems in accordance with the present invention.

FIG. 1 shows a generalized fibre channel environment implementing the method and systems in accordance with the present invention. FIG. 1 illustrates a number of devices and connections between the devices indicated by connecting lines. Each device includes one or more ports. In fibre channel, these ports are generally classified as node ports (N_Ports), fabric ports (F_Port,), and expansion ports (E_Ports). Node ports are located in a node device such as server 101, disk arrays 102 and 103, and tape storage device 104. Fabric ports are located in fabric devices such as switch 106 and switch 107. Optionally, an arbitrated loop network 108, can be linked to the fabric using fabric arbitrated loop ports (FL_Ports).

The devices shown in FIG. 1 are coupled by "links" indicated by lines. A path can be established between two N_Ports using one or more links. For example, a direct or point-to-point path is established using a single link such as the path between server 101 and disk array 102 shown in FIG. 1. In this case, each N_Port manages the point-to-point connection between the other device's N_Port. A circuit-switched path using multiple links can also be provided using a switch 106 or 107. For example, the N_Port in server 101 can establish a path with the N_Port of disk array 103 through switch 106. In this case, each N_Port makes a connection to an F_port in switch 106. Switch 106 also includes an expansion port or E_Port that enables a path to another E_Port in switch 107. Using an inter-switch link (ISL) (i.e., a link that includes a switch) enables each N_Port to couple to each other N_Port in the fabric through one or more paths. Switch 107 also includes a fabric loop port (FL_Port) that supports a link to arbitrated loop 108. Devices 111, 112, and 113 represent user terminals, personal computers, or workstations coupled to the fabric through a conventional direct or network connection.

In accordance with the present invention, one or more of the ports (e.g., N_Ports, F_Ports, E_Ports, and the like) include an extended link service to manage link incident information. The present invention can be implemented in a point-to-point topology illustrated by server 101 and device 102, but is particularly useful in a circuit switched topology through switch 106 and/or switch 107. Similarly, devices within arbitrated loop 108 can implement the ELS in accordance with the present invention to request and supply link incident information with any other device shown in FIG. 1. Loop 108 includes L-ports supporting links between server 110, workstation 112, and workstation 113, as well as an FL_Port supporting a link to switch 107. Hub 109 includes N_Ports supporting links to server 110 and workstations 112 and 113, as well as FL_Port supporting a link to switch 107.

The present invention operates in two distinct phases. A registration phase exists before a Link Incident Record (LIR) can be reported and serves to exchange address information identifying port devices that desire to receive link incident records should a link incident occur. Typically, one device is the centralized intelligence for desiring and processing link incident record information. In this case for example, server 101 is the centralized intelligence and during a registration phase server 101 sends a "Link Incident Record Begistration" (LIRR) request message to disk array devices 102 and 103, tape storage device 104, switches 106 and 107, the loop devices in loop 108, and the hub 109.

Each device that supports the LIR service in accordance with the present invention maintains a registration list (e.g., a database, stack, or equivalent data structure) containing addresses of other devices from which it received LIRR requests. Devices that support the LIR service in accordance with the present invention record the address in the list and respond with an Accept message addressed to the device sending the LIRR request. The Accept message does not need to include any information in its payload.

If additional central intelligence devices for desiring and processing LIR information are implemented, then these devices would also send LIRR request messages to the devices for which LIR information is desired. Each device receives and accepts link incident record registration and maintains an independent registration list.

In this case, host 101 serves as a centralized intelligence for processing and analyzing LIRs. In FIG. 1 link 114 is drawn with a dashed line to indicate a link incident such as a link failure or degradation has occurred. Both switch 106 and disk 103 detect the link incident and generate link incident records (LIRs) that are stored in memory within the devices. For purpose of explanation, it is assumed that the registration list held by switch 106 includes server 101 and the registration list held by disk device 103 includes server 101. Switch 106 selects server 101 from its registration list and generates a first "registered link incident record" (RLIR) request message addressed to the selected recipient. Similarly, disk device 103 selects server 101 from its registration list and generates a second RLIR request message addressed to the selected recipient.

Figure 2:
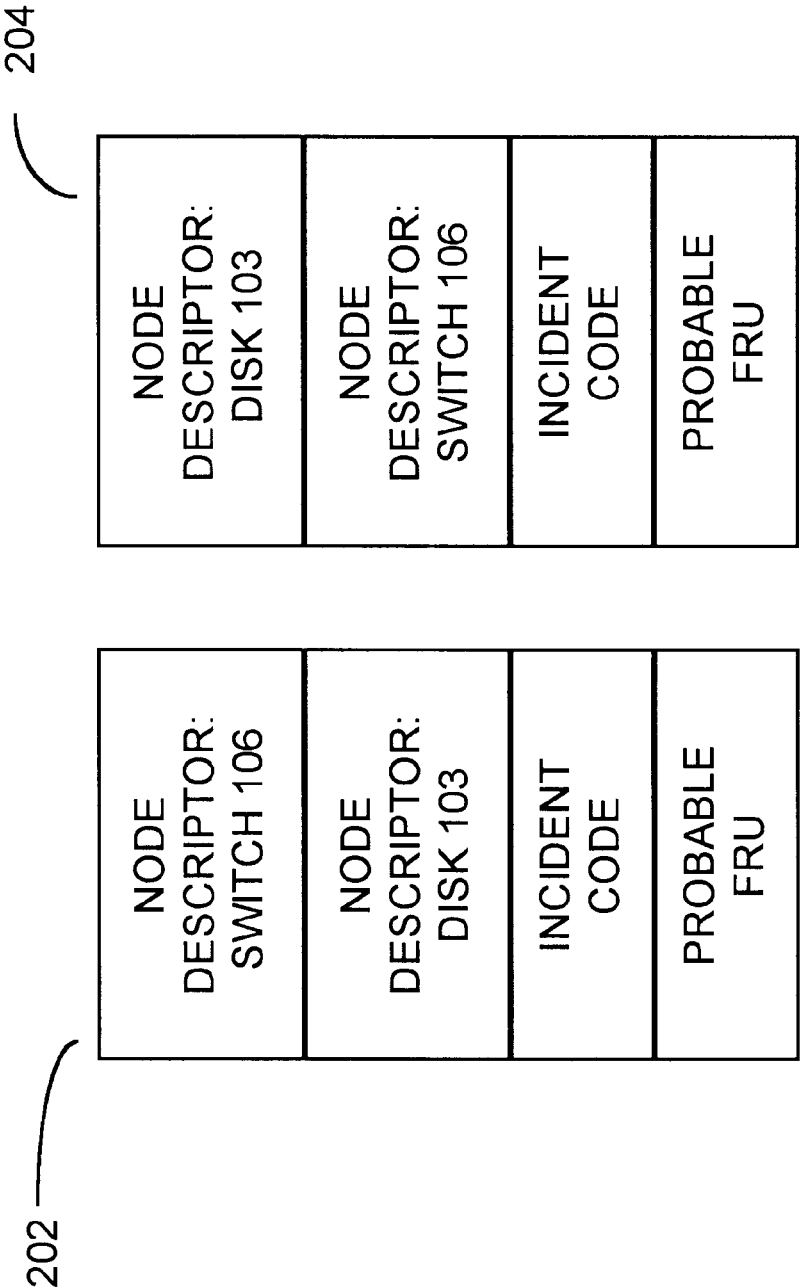
FIG. 2 illustrates exemplary link incident records generated in accordance with the present invention.

Significantly, the LIR information contained in each of the RLIR messages is distinct reflecting the perspective of the particular node detecting the link incident. FIG. 2 illustrates the first link incident record 202 generated by switch 106 and the second link incident record 204 generated by disk 103. The incident codes and in some instances the possible Field Replaceable Unit (FRU) device may differ between records. For example, LIR 202 may indicate an open fiber whereas LIR 204 may indicate a specific hardware failure in the transmit circuit within the node port device of disk 103. The heuristics used within switch 106 and disk 103 to determine the incident code and probable FRU information are a matter of design choice selected to meet the needs of a particular application. It should be understood that the LIR may contain other data selected to be useful in analyzing link incidents and is not limited to the particular information described in the specific examples provided herein.

In a specific example, header fields of the standardized FT-1 frame format include the following fields and settings to implement the ELS frame in accordance with the present invention:

TABLE 1

| Field | Field Description | Field setting |
| --- | --- | --- |
| R_CTL | Routing Control | This field is set to hex '22' for request frames, and to hex '23' for Accept reply frames. |
| CS_CTL | Class Specific Control | This field is set to hex '00'. |
| S_ID | Source ID | This field is set as indicated for the specific source node involved. |
| D_ID | Destination ID | This field is set as indicated for the specific destination node involved. |
| TYPE | Data Structure Type | This field is set to hex '01' indicating Extended Link Service. |

The specific settings shown in Table 1 are exemplary values only and any available hex code values may be used. The example shown in Table 1 is consistent with the FT-1 frame format protocols used to identify extended link services in fibre channel systems. All other fields are set as appropriate according to the rules defined in the FC-PH standard. The first word in the payload specifies the Command Code.

It is contemplated that the present invention will be implemented as an optional Extended Link Service and may be usefully applied to operation of a fabric or point-to-point connection. The ELS in accordance with the present invention is implemented by N_Ports and fabrics that comply with the optional link incident record function described herein.

Link-Incident-Record Registration (LIRR)

As noted above, the first phase operation in accordance with the present invention involves registration of devices that desire to receive LIRs with other devices that may generate the LIRs. An Upper Layer Protocol (ULP) operating on a port device that desires to obtain and process Link-Incident Records (LIRs) must cause its node to register with other nodes of interest. The term "nodes of interest" refers to all nodes in the fabric which the registered node can address and for which it desires to obtain their link-incident records. The Link-Incident-Record Registration (LIRR) extended link service in accordance with the present invention enables a sending device (e.g., an N_Port or NL_Port desiring LIRs) to request the recipient device to add or remove the sending device's address (indicated in the S_ID header field indicated above) to or from the list of N_Ports and NL_Ports registered to receive the registered link-incident record (RLIR) ELS. Registration occurs before a link incident record can be reported, and may be performed after login or at another convenient time.

Figure 3:
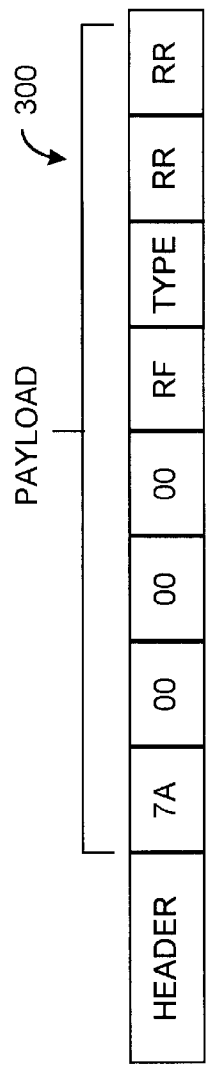
FIG. 3 illustrates an exemplary LIRR request message format in accordance with the present invention.

A suggested format of the LIRR request message payload 300 is shown in FIG. 3. In addition to the above-described header information, four bytes carry a hex '7A 00 00 00' value indicating the ELS in accordance with the present invention. One byte, indicated by "RF" in FIG. 3, indicates the registration function that is requested as described in greater detail below. The LIRR payload 300 also includes one byte indicating the link incident record registration type, and two bytes are reserved as indicated by the "RR" fields in FIG. 3.

The registration function field specifies whether the recipient node adds or removes the sending port's address to or from its list of registered nodes, hereinafter referred to as the established registration list. An exemplary format of the registration function field is shown in table 2.

TABLE 2

| Registration Function | |
| --- | --- |
| Function | value |
| Reserved | 0 |
| Set registration: Register the source port as a valid recipient of subsequent RLIR ELSs for the type specified (i.e. add to the established registration list). | 1 |
| Reserved | 3–254 |
| Clear registration: De-register the source port as a valid recipient of subsequent RLIR ELSs for the type specified (i.e. remove from the established registration list). | 255 |

A single byte is used to indicate the link incident record registration type indicated by the "TYPE" field in FIG. 3. The link-incident-record-registration format field (TYPE in FIG. 3) contains a value indicting the FC-4 device type of the registration being requested for a specific ULP (e.g., SCSI-FCP, SBCCS, etc.). The hex value '00' is reserved as no FC-4 device type can be defined for this value.

Figure 4:
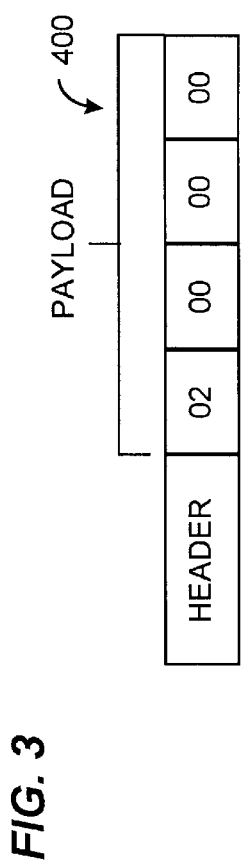
FIG. 4 shows an exemplary accept response message format in accordance with the present invention.

Recipient devices that include the link incident ELS functionality in accordance with the present invention respond to the LIRR with an "Accept" (ACC) ELS reply by transmitting an accept message 400, shown in FIG. 4, that includes a payload indicating that the LIRR was successful. In a particular example, this information is indicated by including a hex '02 00 00 00' in the payload.

In a particular implementation, an N_Port or NL_Port attempts to register as a valid recipient of subsequent link-incident records by sending an LIRR ELS as soon as the requesting N_Port or NL_Port has determined its address identifier and has determined the address identifiers for the nodes of interest. The ULP also indicates the type of link-incident records of interest that are being registered. The recipient N_Port or NL_Port shall respond with an accept (ACC) ELS with no payload if it supports the link incident mechanism in accordance with the present invention.

When the ULP of a registered port is no longer interested in receiving link-incident records from any node or nodes of interest, it sends an LIRR ELS to de-register their node as a valid recipient of link-incident records. The ULP should also indicate the type of link-incident records that are being de-registered. If an LIRR ELS requesting a de-registration function for a node that is not registered is received, the recipient node accepts the request by sending an accept (ACC) ELS and performs no further action.

Each recipient of an LIRR ELS maintains an established registration list of valid registered link-incident record recipients according to the registration type specified. The size of the established registration list maintained by each node for each specified type is a matter of design choice made to meet the needs of a particular application. If the established registration list is full when an "add registration" function occurs, the node does not accept this registration, and rejects this request indicating "unable to perform command request". In a particular implementation, a logout occurring between a node and a valid-registered-recipient node causes de-registration of the valid-recipient node in the established registration list maintained by the node.

A valid-registered recipient shall be capable of receiving and processing link-incident records that are generated according to the Link-incident reporting procedure. The usage and coordination of Link-incident records by ULPs is model dependent.

If a valid-registered recipient receives a Link-Incident Record for a type that does not match its registration type, the recipient node shall reject the RLIR ELS. The preferred implementation is an optional addition to conventional N_Ports and so accommodation should be made to account for other fabric N_Ports that do not elect to support the ELS in accordance with the present invention. If the recipient N_Port or NL_Port does not support the LIRR ELS in accordance with the present invention, it replies with an LS-RJT ELS message with a reason code of "command not supported". If the recipient N_Port or NL_Port cannot perform the requested LIRR registration function, it replies with an LS-RJT ELS message with a reason code of "unable to perform command request". When an N_Port or NL_Port is registering or de-registering for receipt of link-incident records with a fabric device (e.g., a switch), the LIRR ELS is sent to the management server at the protocol-defined address hex 'FFFFFA'.

Link-Incident Record Reporting

The present invention provides a method for an N_Port or NL_Port to send a link-incident record (LIR) to a registered N_Port or NL_Port. This functionality is referred to herein as a "registered link incident record" or RLIR function implemented as an ELS message in a particular example. A link incident is recognized by a node when a condition is detected for which an incident code is defined. When a link incident is recognized and the registration list for the detecting node contains at least one registered recipient, a link-incident record that contains information related to the link incident is created.

When a link-incident record is generated, the node uses a link-incident reporting procedure in accordance with the present invention to pass the LIR to a node that is registered as a valid recipient of RLIR ELSs. When a node that is registered as a valid recipient of link-incident records recognizes a link incident, a record may also be generated, but the link-incident reporting procedure of the present invention may or may not be used.

An N_Port or NL_Port attempts to report a detected link-incident by sending the LIR via an RLIR ELS message after it has determined that at least one node is registered for link-incident reporting. The normal response to an RLIR ELS message is an Accept (ACC) ELS message with no payload. If the recipient N_Port or NL_Port does not support the RLIR ELS, it replies with an LS_RJT ELS message with a reason code of "command not supported". If the recipient N_Port or NL_Port cannot accept the specified link-incident-record type, it shall reply with an LS-RJT ELS message with a reason code of "unable to perform command request".

If the reporting node has more than one node in its established registration list of valid LIR recipients, the selection of the destination node for the RLIR ELS message is model dependent.

A ULE may obtain link-incident records for its own unique purposes. LIRs may be used, for example, to report link anomalies, to determine problem sources, and to isolate link errors to a particular Field Replaceable Unit (FRU) in a failing node or link.

Figure 5:
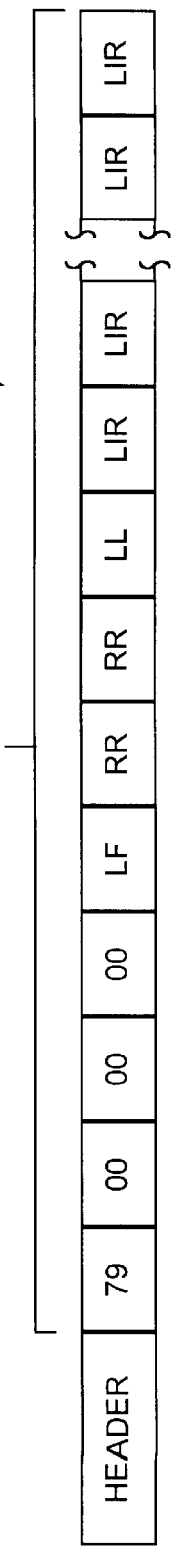
FIG. 5 illustrates an exemplary RLIR request message format in accordance with the present invention.

In the preferred implementation, the RLIR ELS is implemented using an FT-1 frame format such as exemplary RLIR frame 500 shown in FIG. 5. Message 500 includes appropriate header information as described hereinbefore. The link-incident-record-format field identified by LF contains a value indicating the FC-4 device type of the record being presented for a specific ULP (e.g. SCSI-FCP, SBCCS, etc.). The hex value '00' is reserved as no FC-4 device type can be defined for this value.

Link-incident-Record length field (LL in FIG. 5) is specified according to the link-incident-record format indicated in the LF for the respective ULP. The length value specifies the number of bytes in the link-incident-record payload (i.e., the number of total LIR bytes required to transmit the entire LIR record). The value in the LL field does not include word 0 and word 1 of the RLIR ELS payload. This byte length is a multiple of four, and is dependent on the link-incident-record data format. The minimum value of this field is four bytes and the maximum value of this field is 120 bytes.

The bytes labeled LIR in FIG. 5 include the link-incident-record data. The specific format of the link-incident-record-data field is dependent on the specified FC-4 device type. Link-incident-record data format and content is subject to the requirements of the ULP and the intended usage of the LIR data. For any specific FC-4 device-type, the ULP defines the LIR format, fields used, and size of the parameters. Exemplary fields used in the LIR record (see FIG. 6) include:

Incident Qualifier (IQ): Describes the manner in which the contents of the Link-Incident Record are interpreted. Typical manner specifications may include:

1) Switch: Indicates that the incident node, identified by the Incident-Node Descriptor, is a switch node.
2) Expansion Port: When the IQ indicates that the incident node is a switch node, this specification indicates whether or not the switch node is an Inter-Switch-Link Expansion port (E_Port).
3) Reporting-status order: Identifies the reporting-status for the link incident. Typical reporting status orders include Informational report; link degraded but operational—the incident node is not in a Link-Failure or Off-line state; and link not operational—the incident node is in a Link-Failure or Off-line state;
4) Subassembly type: Identifies the type of subassembly used for the node; e.g. laser.
5) Incident-specific-information identification: Identifies the purpose of the incident-specific-information field (e.g. the Incident-specific-information field provides FRU identification).

Incident Code (IC): Contains the incident code which describes the incident event that was observed by the incident node. Incident codes shall include values:

1) Implicit incident: A condition which has been caused by an event known to have occurred within the incident node has been recognized by the incident node. The condition affects the attached link in such a way that it may cause a link incident to be recognized by the attached node.
2) Bit-error-rate threshold exceeded: The number of code-violation errors recognized by the incident node has exceeded a threshold (see FC-PH clause 5.1).
3) Link Failure—loss of signal or synchronization: A Loss-of-Synchronization condition has been recognized by the incident node, and it persisted for more than the R_T_TOV time-out period. A Loss-of-Signal condition has been recognized by the incident node (see FC-PH clause 16.4.2).
4) Link Failure—Not-Operational Primitive Sequence (NOS) recognized: The Not-Operational Primitive Sequence has been recognized by the incident node (see FC-PH clause 16.5.3.2).
5) Link Failure—Primitive Sequence time-out: The incident node has recognized either a Link Reset-Protocol time-out (see FC-PH clauses 16.5.2.1, 16.5.2.2, and 16.5.2.3) or a tine-out when timing for the appropriate response while in the NOS Receive state and after NOS is no longer recognized (see FC-PH clause 16.5.3.2).
6) Link Failure—invalid Primitive Sequence for port state: Either a Link-Reset (LR) or a Link Reset-Response (LRR) Primitive Sequence was recognized by the incident node while in the Wait-for-OLS state (see FC-PH clause 16.5.4.3).

After a Link Failure is detected, the ULP may delay recognizing and considering this link failure as a reportable link-incident condition, for a specific period of time. With some FC-4 protocols, a ULP may be capable of transparently recovering from this Link-Failure condition, and not generate a Link-incident Record. If the Link-Failure condition persists for longer than the FC-4 specified time-out period, then a Link-Incident Record is generated and reported.

Expansion Port Address identifier (EPAI): When the IQ field of the LIR indicates that the incident node is an Inter-Switch-Link Expansion port, this parameter contains the Domain and Area address identifiers (hex 'dd aa') of the other Expansion port on this ISL.

Incident-Node Descriptor: Contains the Node-identification Data of the incident node. The contents of Node-Identification Data are described in the appropriate ULP standard or technical report.

Attached-Node Descriptor: Contains the Node-Identification Data of the node attached to the incident node at the time the link incident was detected. The contents of Node-Identification Data are described in the appropriate ULP standard or technical report Incident-Specific Information: When the IQ field of the LIR identifies the incident-specific information, this parameter contains model-dependent incident information, which may provide additional information related to the incident.

When a RLIR message is sent, the recipient node may respond by accepting or rejecting the LIR. Any number of reasons may cause a node to reject an RLIR message even though it had previously registered its desire to receive the LIR information. Ordinarily, the recipient node signifies acceptance of the RLIR request and returns an accept message having hex '02 00 00 00' in the payload.

Reporting Procedure

The detecting node preferably generates one LIR per link incident. The number of LIRs a node may hold depends on the design limitations of a particular device in which the LIR is to be generated. If the detecting node attempts to generate a LIR but does not have resources to hold the record until it is accepted by a node that is registered as a valid recipient, the oldest LIR is preferably discarded, and the newer LIRs are retained.

The node detecting a link-incident condition shall present the LIR by sending an RLIR ELS to any node registered as a valid recipient for the FC-4 device type specified. If no registration has been established (i.e., the registration list is empty for a particular FC-4 device type), it is model dependent as to whether the node retains or discards the Link-Incident Record. When more than one valid node is registered, the selection of which registered node should receive the RLIR ELS is a matter of design choice. After sending an RLIR ELS containing an LIR and receiving the Accept (ACC) ELS, the node may discard, log, or archive the LIR. In this particular invention, the node will discard the LIR after receiving the Accept ELS message.

After the RLIR ELS is sent, it is considered to be "outstanding" until it has been accepted, rejected, or timed out. A sending node desirably does not send another RLIR ELS on any link while an RLIR is outstanding. One RLIR ELS is sent per LIR. After the node sends the RLIR ELS, it waits for the Accept to the RLIR ELS or until an ELS time-out occurs. If any LIR remains unaccepted for longer than a specified time-out period, the node shall reestablish initiative to send another RLIR ELS to any node which it has an established registration. The node sends one RLIR ELS each time the period expires and begins timing again when the RLIR ELS has been sent.

Specific Example

By way of example, a specific implementation is described for an ELS request/reply between SBCCS type devices. The link-incident-record format for FC-4 device type SBCCS, is hex '18'. Hence, the LIRR message will resemble that shown in FIG. 3 with the TYPE field containing hex '18'. The header includes fields indicated in Table 1 and address information directing the LIRR message to the desired port (N_Port, F_Port, E_Port, and the like).

A RLIR ELS request is generated comprising one message that resembles that shown in FIG. 5 with header information as indicated in Table 1 addressed to the node registered to receive the RLIR message. The link-incident-record data length for link-incident-record-data format FC-4 device type SBCCS is suggested to be 100 bytes. One RLIR message 500 includes 100 bytes of LIR data.

Figure 7:
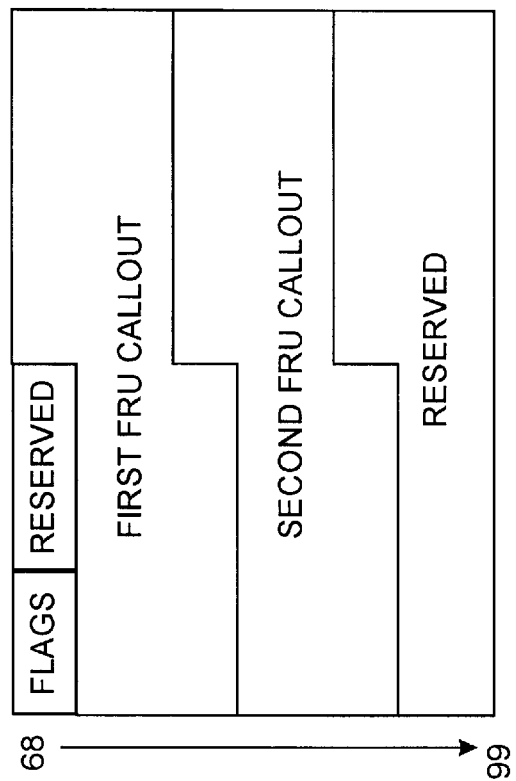
FIG. 7 shows a detailed example of incident specific information for FRU callout in accordance with the present invention.
Figure 6:
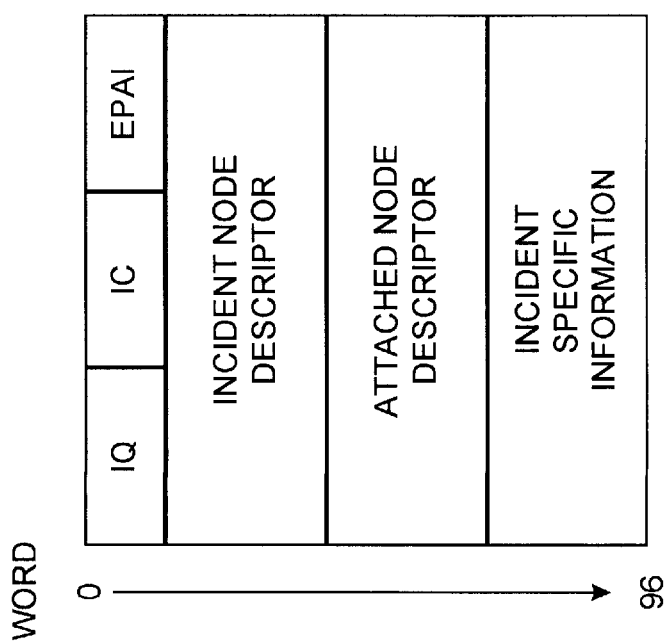
FIG. 6 shows a detailed example of a link incident record in accordance with the present invention.

A suggested format of the LIR for an FC-4 device type SBCCS is shown in FIG. 6 and FIG. 7. In FIG. 6 and FIG. 7, the horizontal axis represents a word number in the LIR and the vertical axis represents a particular bit within the word. It should be understood that the particular example shown in FIG. 6 and FIG. 7 is suggested only by way of example to improve understanding and is not a limitation of the present invention.

Byte 0 includes an incident qualifier (IQ) that describes the manner in which the contents of the LIR are to be interpreted. Particular values and assigned meanings for this example are shown in Table 3.

TABLE 3

| Bits | Meaning |
| --- | --- |
| 0 | Reserved. |
| 1 | Reserved. |
| 2 | When one, bit 2 indicates that the incident node, identified by the incident-node descriptor, is a switch node. When zero, bit 2 indicates that the incident node is not a switch node. |
| 3 | Expansion Port: When bit 2 is one, indicating that the incident node is a switch node, bit 3 indicates whether or not the switch node is an Inter-Switch-Link Expansion port (E_Port). When one, bit 3 indicates that the switch node is an Inter-Switch-Link Expansion port. When zero, bit 3 indicates that the switch node is not an Inter-Switch-Link Expansion port. |
| 4–5 | Reporting order: Bits 4 and 5 constitute a two-bit code which identifies the reporting order for the link incident. The codes and their meanings are as follows:<br>    0    Informational report: All link incidents reported with incident-code bit 0 set to one use reporting order 0.<br>    1    Link degraded but operational: Link incidents reported with incident-code bit 0 set to zero use reporting order 1 if the link associated with the incident node is not in a Link-Failure or Offline state as a result of the event which generated the Link-Incident Record.<br>    2    Link not operational: Link incidents reported with incident-code bit 0 set to zero use reporting order 2 if the link associated with the incident node is in a Link-Failure or Offline state as a result of the event which generated the Link-Incident Record.<br>    3    Reserved. |
| 6 | Subassembly type: When one, bit 6 specifies that the type of subassembly used for the node that is the subject of this Link-Incident Record is laser. When zero, bit 6 specifies that the type of subassembly used for the node that is the subject of this Link-Incident Record is not laser. |
| 7 | FRU identification: When one, bit 7 specifies that the incident-specific-information field is in a format that provides field-replaceable-unit (FRU) identification. When zero, bit 7 specifies that the incident-specific-information field is vendor unique (model dependent). |

Byte 1 contains an incident code (IC) which describes the incident that was observed by the incident node. Bit 0 of the incident code indicates whether the LIR is a primary or secondary report of the link incident. When bit 0 is set to zero, the LIR is a primary report. When bit 0 is set to one, the LIR is a secondary report. Bits 1–7 of the IC field contain a value that specifies the type of incident which was observed. As an example, the values and their meanings can be specified as follows:

0 Reserved.

1 Implicit incident: A condition which has been caused by an event known to have occurred within the incident rode has been recognized by the incident node. The condition affects the attached link in such a way that it may cause a link incident to be recognized by the attached rode.

2 Bit-error-rate threshold exceeded: The number of code-violation errors recognized by the incident node has exceeded a threshold.

3 Link Failure—loss of signal or synchronization: A Loss-of-Synchronization condition has been recognized by the incident node, and it persisted for more than the R_T TOV timeout period. A Loss-of-Signal condition has been recognized by the incident node.

4 Link Failure—Not-Operational Primitive Sequence (NOS) recognized: The Not-Operational Primitive Sequence has been recognized by the incident node.

5 Link Failure—Primitive Sequence timeout: The incident node has recognized either a Link-Reset-Protocol timeout or a timeout when timing for the appropriate response while in the NOS Receive state and after NOS is no longer recognized.

6 Link Failure—invalid Primitive Sequence for port state: Either an LR or LRR Primitive Sequence was recognized by the incident node while in the Wait-for-OLS state.

After a Link Failure is detected, the ULP may delay recognizing and considering this link failure as a reportable link-incident condition, for a specific period of time. With some FC-4 protocols, a ULP may be capable of transparently recovering from this Link-Failure condition, and not generate a Link-Incident Record. If the Link-Failure condition persists for longer than the FC-4 specified timeout period, then a Link-Incident Record is generated and reported.

7-127 Reserved.

The Expansion Port Address Identifier (EPAI) conveys information about expansion port addresses for inter switch links. When bits 2 and 3 of the IQ field are both ones, indicating that the incident node is an Inter-Switch-Link Expansion port, bytes 2 and 3 of word 0 contain the Domain and Area address identifiers (hex 'dd aa') of the other Expansion port on this ISL.

The Incident-Node Descriptor field contains the node descriptor of the incident node. Likewise, the Attached-Node Descriptor field contains the node descriptor of the node attached to the incident node at the time the link incident was detected. The contents of an exemplary node descriptor are described in U.S. patent application Ser. No. 09/225,949 assigned to the assignee of the present invention.

Incident-Specific Information: When bit 7 of the IQ field is set to zero, bytes 68–99 contain node-dependent incident information, which may provide additional information related to the incident. When bit 7 of the IQ field is set to one, bytes 68–99 contain field-replaceable-unit (FRU) identification information. When the incident-specific-information field contains FRU identification information, an exemplary format of the incident-specific information included in bytes 68–99 of the particular example is illustrated in FIG. 7.

Flags: Byte 68 contains the FRU flags field. A particular example of the values and meaning assigned to those values of bits 0–7 is shown in Table 4:

TABLE 4

| Bit | Meaning |
| --- | --- |
| 0 | Reserved |
| 1 | Format bit--'0' indicates FRU part number format and '1' indicates FRU code format. |
| 2–5 | Reserved |
| 6–7 | Validity code for FRU fields:<br>00 Reserved.<br>01 First-FRU-callout field valid; Second-FRU-callout field contains 12 bytes of model-dependent data.<br>10 First-FRU-callout and second-FRU-callout fields valid.<br>11 Reserved. |

Byte 69 is reserved and set to zero. Bytes 70–81 contain the first-FRU-callout identification information. The format of a valid FRU-callout field depends on the value of bit 1

(format bit) of the FRU-flags field within the same Link-Incident Record. Bytes 82–93 contain either the second-FRU-callout identification information or 12 bytes of vendor unique (i.e., implementation-dependent) information, depending on the value of bits 6–7 of the IRU-flags field. Bytes 94–99 are reserved and set to zeros. When the format bit is set to zero, the FRU-callout field is in ASCII, right justified, with either leading blanks or leading ASCII zeros. When the format bit is set to one, the FRU-callout field is in hexadecimal, right justified, with leading zeros.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for implementing a link level service in a computer network comprising the steps of:

providing a first port device;

providing a second port device;

providing a physical-layer communications coupling between the first port device and the second port device;

prior to a link incident condition occurring, causing the first port device to send a link incident record registration (LIRR) message addressed to the second port device;

transporting the LIRR message to the second port device using the communications coupling;

storing the link incident record (LIR) in the second port device;

in response to the LIRR message, causing the second port device to generate an accept message addressed to the first port device; and transporting the accept message to the first port device using the communications coupling.

2. The method of claim 1 wherein the step of storing the LIR further comprises the steps of:

providing a data structure within the second port device having a registration list; and causing the second port device to add a source identification (S_ID) field from the LIRR message to the registration list.

3. The method of claim 1 wherein the communications coupling comprises a fibre channel fabric and the step of transporting further comprises using an FC-4 layer protocol.

4. The method of claim 1 wherein the communications coupling comprises a fibre channel fabric and the step of transporting further comprises using an FC-2 layer protocol.

5. The method of claim 1 wherein the communications coupling comprises a fibre channel fabric and the step of transporting further comprises using an FT-1 transport layer protocol.

6. The method of claim 1 further comprising:

in response to a link incident, causing the second port device to generate a link incident record; and sending the link incident record to at least one device for which the second port device has a stored LIR.

7. The method of claim 6 further comprising the steps of:

storing in the second port device a plurality of incident codes, each incident code corresponding to a preselected condition that can potentially occur on the communication coupling; and causing the second port device to monitor the communications coupling to detect a condition for which an incident code is defined.

8. The method of claim 6 further comprising executing an upper layer protocol (ULP) operating on the first port device;

passing the LIR data to the ULP; and causing the ULP to take remedial action in response to the LIR.

9. The method of claim 1 wherein the RLIR message includes a type field indicating an FC-4 device type and the step of creating an accept message is performed only when the second port device is associated with the FC-4 device type indicated in the type field of the RLIR message.

10. A system for communicating data comprising:

a first port device;

a second port device;

a data structure within the second port device configured to store link incident report registration data;

a physical-layer communications coupling between the first port device and the second port device;

an upper layer protocol (ULP) operating on the first port device and causing the first port device to generate a registered link incident record (RLIR) message addressed to the second port device;

a transmit device within the first port device and operative to receive and send the RLIR message over the communications coupling;

a link-level facility operating in the second port device for receiving and recognizing the RLIR message, storing and address of the first port device in the data structure, and creating an accept message addressed to the first port device; and a transmit device within the second port device and operative to receive and send the accept message over the communications coupling.

11. The system of claim 10 wherein the communications coupling comprises a switch.

12. The system of claim 10 wherein the first port device comprises a fibre channel node port.

13. The system of claim 10 wherein the first port device comprises a fibre channel fabric port.

14. The system of claim 10 wherein the first port device comprises a fibre channel expansion port.

15. The system of claim 10 wherein the RLIR message includes a type field indicating an FC-4 device type and the link level facility is configure to create an accept message only when the second port device is associated with the FC-4 device type indicated in the type field of the RLIR message.

16. The system of claim 10 further comprising:

a detector within the second port for detecting a link incident condition;

a link incident record generator within the second port and coupled to the detector to generate a link incident record (LIR) and address the LIR to at least one device having a registration stored in the data structure in response to a detected link incident condition; and a transmit device within the second port device and operative to receive and send the LIR over the communications coupling.

* * * * *